(12) United States Patent
Xu et al.

(10) Patent No.: US 11,319,094 B2
(45) Date of Patent: May 3, 2022

(54) METHOD FOR ACCURATELY AND EFFICIENTLY CALCULATING DENSE EPHEMERIS OF HIGH-ECCENTRICITY ORBIT

(71) Applicant: Purple Mountain Observatory, Chinese Academy of Sciences, Nanjing (CN)

(72) Inventors: Jin Xu, Nanjing (CN); Zhijun Dai, Nanjing (CN)

(73) Assignee: PURPLE MOUNTAIN OBSERVATORY, CHINESE ACADEMY OF SCIENCES, Nanjing (CN)

( * ) Notice: Subject to any disclaimer, the term of this patent is extended or adjusted under 35 U.S.C. 154(b) by 0 days.

(21) Appl. No.: 17/435,404

(22) PCT Filed: Jul. 16, 2020

(86) PCT No.: PCT/CN2020/102348
§ 371 (c)(1),
(2) Date: Sep. 1, 2021

(87) PCT Pub. No.: WO2021/139129
PCT Pub. Date: Jul. 15, 2021

(65) Prior Publication Data
US 2022/0091277 A1    Mar. 24, 2022

(30) Foreign Application Priority Data

Jan. 6, 2020 (CN) .......................... 202010011887.X (51) Int. Cl.
*B64G 3/00* (2006.01)
*G06F 17/13* (2006.01)
*G01S 19/27* (2010.01)

(52) U.S. Cl.
CPC ................ *B64G 3/00* (2013.01); *G01S 19/27* (2013.01); *G06F 17/13* (2013.01)

(58) Field of Classification Search
CPC ............ B64G 3/00; G01S 19/27; G06F 17/13
See application file for complete search history.

(56) References Cited

U.S. PATENT DOCUMENTS

| 8,125,382 B2* | 2/2012 | Derbez | ................... | G01S 19/27 |
| | | | | 342/357.42 |
| 2013/0181866 A1* | 7/2013 | Derbez | ................... | G01S 19/05 |
| | | | | 342/357.66 |

(Continued)

FOREIGN PATENT DOCUMENTS

| CN | 102162731 A | | 8/2011 | |
| CN | 102878997 A | * | 1/2013 | .............. G06F 17/11 |

(Continued)

OTHER PUBLICATIONS

Chang Yuan, et al., Application of Sliding Neville Interpolation Algorithm in GPS Precise Ephemeris Interpolation, Journal of Geomatics, 2017, pp. 53-60, vol. 42 No. 1.
Felix R. Hoots, et al., Models for Propagation of NORAD Element Sets, Aerospace Defense Command Peterson AFB CO Office of Astrodynamics, 1980, 87 pages.

(Continued)

*Primary Examiner* — Behrang Badii
*Assistant Examiner* — Jalal C Coduroglu
(74) *Attorney, Agent, or Firm* — Bayramoglu Law Offices LLC (57) ABSTRACT

A method for accurately and efficiently calculating a dense ephemeris of a high-eccentricity orbit is provided. With respect to the ephemeris calculation of the high-eccentricity orbit, the method constructs uneven interpolation nodes through time transformation and interpolates by an interpolation polynomial based on uneven interpolation nodes to obtain a dense ephemeris, which significantly improves the calculation efficiency and accuracy. Based on a large-scale numerical experiment, the method derives an optimal uni- (Continued)

versal value (that is, 0.3) of a transformation parameter for all orbital eccentricities and various interpolation polynomials. In the case of using the optimal universal value of the transformation parameter δ, the method further verifies the Hermite interpolation polynomial as the preferable one among various interpolation polynomials.

10 Claims, 4 Drawing Sheets

(56) References Cited

U.S. PATENT DOCUMENTS

| | | | | |
|---|---|---|---|---|
| 2020/0158862 | A1* | 5/2020 | Mahmoud | G01S 13/726 |
| 2020/0377235 | A1* | 12/2020 | Wasson | B64G 1/26 |

FOREIGN PATENT DOCUMENTS

| | | | | | |
|---|---|---|---|---|---|
| CN | 102878997 | A | | 1/2013 | |
| CN | 103728980 | A | | 4/2014 | |
| CN | 107193020 | A | * | 9/2017 | G01S 19/37 |
| CN | 107193020 | A | | 9/2017 | |
| CN | 109655064 | A | | 4/2019 | |
| CN | 109738919 | A | * | 5/2019 | G01C 21/20 |
| CN | 109738919 | A | | 5/2019 | |
| CN | 111209523 | A | | 5/2020 | |
| CN | 111209523 | B | * | 12/2020 | G06F 17/11 |
| RU | 2550814 | C2 | * | 5/2015 | |
| WO | 0065751 | A1 | | 11/2000 | |
| WO | WO-0065751 | A1 | * | 11/2000 | G01S 19/05 |
| WO | WO-2014171999 | A2 | * | 10/2014 | G01S 19/51 |

OTHER PUBLICATIONS

Liu Lin, Orbit Theory of Spacecraft, 2000, 621 pages, National Defense Industry Press.

Lei Yu, et al., Analysis of Interpolation for GPS precise ephemeris using sleek Lagrange interpolation, Engineering of Surveying and Mapping, 2013, pp. 34-36, vol. 22 No. 2.

Sun Teng-KE, The research of GPS Precise Interpolation Methods Based on Lagrange and Chebyshev, Geomatics & Spatial Information Technology, 2014, pp. 33-42, vol. 37 No. 2.

Wang Wei, et al., Three Kinds of Compass Satellite Precise Ephemeris Interpolation Method Analysis Comparative, GNSS World of China, 2016, pp. 60-65, vol. 41 No. 2.

Huang Tian-Yi, et al., Adams-Cowell Integrator with a First Sum, Acta Astronomica Sinica, 1992, pp. 413-419, vol. 33 No. 4.

Oliver Montenbruck, et al., Satellite Orbits-Models, Methods and Applications, 2000, 369 pages, Springer-Verlag.

Huang Tian-Yi, et al., Stabilization and Time Transformation, Acta Astronomica Sinica, 1981, vol. 22 No. 4.

Li Qingyang, Principles of Numerical Calculation, 2000, Tsinghua University Press.

C. Berger, et al., Improvement of the empirical thermospheric model DTM: DTM94—a comparative review of various temporal variations and prospects in space geodesy applications, Journal of Geodesy, 1998, pp. 161-178, 72.

Meeus J., Astronomical formulae for calculators, Tweede Druk, 1979, pp. 137-143.

Shou-Cun Hu, et al., Using Chebyshev polynomials interpolation to improve the computation efficiency of gravity near an irregular-shaped asteroid, CAS Key Laboratory of Planetary Sciences, Purple Mountain Observatory, 2017, 17 pages.

* cited by examiner

METHOD FOR ACCURATELY AND EFFICIENTLY CALCULATING DENSE EPHEMERIS OF HIGH-ECCENTRICITY ORBIT

CROSS REFERENCE TO THE RELATED APPLICATIONS

This application is the national stage entry of International Application No. PCT/CN2020/102348, filed on Jul. 16, 2020, which is based upon and claims priority to Chinese Patent Application No. 202010011887.X, filed on Jan. 6, 2020, the entire contents of which are incorporated herein by reference.

TECHNICAL FIELD

The present disclosure belongs to the field of astrometry and celestial mechanics, and specifically provides a method for accurately and efficiently calculating a dense ephemeris of a high-eccentricity orbit, which solves the problem of inefficient calculation of high-eccentricity orbits in space object cataloging through the reasonable use of a high-accuracy numerical method.

BACKGROUND

The cataloging and management of space objects involve complex orbital calculations. When dealing with a large number of space objects, the accuracy of orbital calculation must satisfy the requirement for object movement prediction, and the calculation efficiency must be ensured. In the process of cataloging, the minimum requirement for the orbital calculation efficiency is to ensure that the overall orbital calculation time is not greater than the data acquisition time of the observation equipment, so as to avoid a bottleneck caused by the accumulation of observation data, which will hinder the cataloging process. At present, the widely used cataloging analysis methods are those disclosed by Hoots FR; Roehrich RL. *Models for propagation of NORAD element sets* [R]. AEROSPACE DEFENSE COMMAND PETERSON AFB CO OFFICE OF ASTRODYNAMICS, 1980 and Liu Lin. *Orbit Theory of Spacecraft* [M]. Beijing: National Defense Industry Press, 2000 and are more efficient than numerical methods. However, with the development of observation technology, the orbital calculation accuracy (having a model error of hundreds of meters) of the current analysis methods cannot match the current observation accuracy (having a radar ranging accuracy superior to 20 meters and an optical angle measurement accuracy superior to 10 arcseconds), thus failing to reach the desired accuracy for orbit determination. Based on this, the numerical methods have potential application value in cataloging.

The numerical methods can achieve higher orbital calculation accuracy, but their orbital dynamic model, that is, the integral right function, is more complicated. In the orbital calculation process, the cataloging typically involves the generation and calculation of the dense ephemeris. For example, in orbit determination and dense points prediction based on dense observation data (sampling frequency $\geq 1$ Hz), due to the dense distribution of the ephemeris points, the integration step cannot be fully extended, which greatly increases the calculations of the right function and seriously reduces the calculation efficiency of the numerical methods. The interpolation method is a good choice to overcome such a problem.

There are various interpolation methods used for dense ephemeris generation, including those disclosed in Lei Yu, Zhao Danning, et al. *Analysis of interpolation for GPS precise ephemeris using sleek Lagrange interpolation* [J]. Engineering of Surveying and Mapping, 2013(02):38-40; Sun Tengke. *The research of GPS precise interpolation methods based on Lagrange and Chebyshev* [J]. Geomatics & Spatial Information Technology, 2014(2); Wang Wei, Chen Mingjian, et al. *Comparative analysis on precise ephemeris interpolation methods of three types of Beidou satellites* [J]. GNSS World of China, 2016(2):60-65. These methods are based on interpolation nodes that are evenly spaced in time, and their research results are only suitable for near-circular navigation satellite orbits with moderate motion characteristics, rather than the less but not least common high-eccentricity orbits with sharp motion characteristics in cataloging. Besides, the Adams-Cowell method (disclosed in Huang Tianyi, Zhou Qinglin. *Adams-Cowell integrator with a first sum* [J]. Acta Astronomica Sinica, 1992, 33(4):413-419]) provides a good solution for calculating the dense ephemeris of a small-eccentricity orbit. This method is a multi-step method using fixed-step integration, and it includes the formula of integration and the formula of interpolation matching with integration in accuracy. However, it cannot effectively reduce the local truncation error due to the fixed integration step, and has low numerical stability, so it is not suitable for the calculation of high-eccentricity (empirical eccentricity $e > 0.2$) orbits. The single-step methods can flexibly change the integration step, and effectively reduce the local truncation error through the step change, which is suitable for the precise ephemeris calculation of high-eccentricity orbits. However, the single-step methods need to calculate the right function multiple times in each step, and most single-step methods lack a formula of interpolation matching with the formula of integration. For a few single-step methods, such as Runge-Kutta methods of some orders (disclosed by Montenbruck O, Gill E. *Satellite Orbits-Models, Methods and Applications*, Springer-Verlag, Berlin. 2000.), although they have a matching formula of interpolation, the calculation thereof are complicated. Further, these single-step methods are likely to restrain the optimization selection and flexible use of other methods, and thus, they are not recommended in the dense ephemeris calculation of high-eccentricity orbits when used alone.

High-eccentricity orbits account for a small proportion (about 12%) of space objects, yet the calculation of high-eccentricity orbits is an important item with which to be concerned due to the amount of rapidly growing space debris. In order to solve the problem of imbalance between the calculation accuracy and efficiency in the calculation of a dense ephemeris of a high-eccentricity orbit, the present disclosure proposes a method for constructing uneven interpolation nodes, which is combined with a selected interpolation polynomial and performs fast interpolations on dense ephemeris points. The solution can be used in coordination with a general single-step integration method and can also meet the requirement for a high-accuracy and high-efficiency calculation of the dense ephemeris of the high-eccentricity orbit.

SUMMARY

The cataloging of space objects generally involves the generation and calculation of dense ephemerides. At present, there is no technical solution of efficiently and accurately performing the numerical calculation for high-eccentricity orbits, and the cataloging requirements can hardly be met. In order to promote the cataloging of space objects and its application, the present disclosure proposes a method for accurately and efficiently calculating a dense ephemeris of a high-eccentricity orbit.

Although the method of the present disclosure is proposed for the orbital calculation efficiency of a high-eccentricity orbit, it is not limited to this specific orbit type. The method can be extended to other applications such as broadcast ephemeris prediction of navigation satellites and ephemerides compilation of natural celestial bodies, and has a broader application prospect than the currently commonly used methods.

To achieve the above objective, the present disclosure adopts the following technical solutions.

A method for accurately and efficiently calculating a dense ephemeris of a high-eccentricity orbit, where the method implements the ephemeris calculation of a space object by solving a dynamic equation with initial values, and includes the following steps:

step 1: calculating the initial values, including a semi-major axis $a_0$, an orbital period $P_t^0$ and an eccentricity $e_0$ of an osculating orbit of the space object at a time $t_0$;

step 2: introducing a transformation parameter $\delta$ to construct an orbital period transformation factor $\beta$;

step 3: determining a number N of the uneven interpolation nodes in an orbital period by an interpolation method;

step 4: constructing a set of uneven interpolation nodes $\{T_i\}$ from an initial node, and generating ephemeris values on the set of interpolation nodes by numerical integration; and step 5: performing an interpolation on dense time points $\{t_i\}$ according to the set of uneven interpolation nodes $\{T_i\}$ and the ephemeris values of the set of interpolation nodes, so as to complete all ephemeris calculations.

In order to optimize the above technical solution, the present disclosure further includes the following.

Further, the ephemeris calculation of a space object corresponds to the solving of a dynamic equation as follows:

$$\ddot{\vec{r}} = \vec{F}(\vec{r}, \dot{\vec{r}}, t) = \vec{F}_0(\vec{r}) + \vec{F}_\varepsilon(\vec{r}, \dot{\vec{r}}, t) \quad (1)$$

where, $\vec{F}$ represents a synthetic force acting on the object; $\vec{F}_0$ represents the central gravity of the earth; $\vec{F}_\varepsilon$ represents the perturbations; $\vec{r}$ represents a position vector; $\dot{\vec{r}}$ represents a velocity vector; a position vector $\vec{r}(t_0) = \vec{r}_0$ and a velocity vector $\dot{\vec{r}}(t_0) = \dot{\vec{r}}_0$ of the object at $t_0$ are known; $t_i$, i=1, 2, 3, . . . m represents a set of designated densely distributed time points; the calculation of the dense ephemeris comes down to calculating a position vector $\vec{r}(t_i) = \vec{r}_i$ and a velocity vector $\dot{\vec{r}}(t_i) = \dot{\vec{r}}_i$ of the object at $t_i$ from the known $\dot{\vec{r}}_0$ and $\dot{\vec{r}}_0$; considering that $t_0$ may be between the minimum value of $\{t_i\}$ and the maximum value of $\{t_i\}$, $\{t_i\}$ is divided into $\{t_j^b\}$ and $\{t_k^c\}$; $\{t_j^b\}$ includes $m_j$ elements, where $m_j \geq 0$, the $m_j$ elements increase monotonously under a subscript j, $t_0 < t_j^b$; $\{t_k^c\}$ includes $m_k$ elements, where $m_k \geq 0$, the $m_k$ elements decrease monotonically under a subscript k, $t_0 > t_k^c$, $m_j + m_k = m$.

Further, in step 1: the initial values, including the semi-major axis $a_0$, the orbital period $P_t^0$ and the eccentricity $e_0$ of the osculating orbit of the space object at $t_0$ are calculated as follows:

$$a_0 = \frac{\mu r_0}{-\dot{r}_0^2 r_0 + 2\mu} \quad (2)$$

$$P_t^0 = 2\pi a_0 \sqrt{a_0} / \sqrt{\mu} \quad (3)$$

$$e_0 = \sqrt{1 - |\vec{r}_0 \times \dot{\vec{r}}_0|^2 / \mu a_0} \quad (4)$$

where, $\mu$ represents geocentric constant of gravitation; $r_0$ is the modulus of $\vec{r}_0$; $\vec{r}_0$ and $\dot{\vec{r}}_0$ represent the position vector and the velocity vector of the object at $t_0$, respectively.

Further, in step 2, the transformation parameter $\delta$ is introduced to express the orbital period transformation factor $\beta$, and $\beta$ is calculated by performing a definite integration:

$$\beta = \frac{1}{2\pi} \int_0^{2\pi} \frac{1}{(1 - e\cos E)^\delta} dE \quad (5)$$

where, $\beta$ is a constant related to the orbital eccentricity e and $\delta$; In practices, the value e is substituted by $e_0$, and $\delta$ is a numerical experiment result of 0.3; E represents an orbital eccentric anomaly.

Further, in step 3, by taking e and $\delta$ as discrete independent variables, a numerical experiment is carried out based on a selected interpolation method to determine a minimum value of N that meets an orbital calculation accuracy requirement, thereby forming a N-query table, the value of N corresponding to the known e and $\delta$ is determined by consulting the table.

Further, in step 4, the interpolation nodes are constructed by taking $t_0$ as an initial node, that is, $T_0 = t_0$, where $T_0$ is a time corresponding to the initial node; ephemeris values $\vec{R}_0 = \vec{r}_0$ and $\dot{\vec{R}}_0 = \dot{\vec{r}}_0$ on the initial node are known; a set of uneven interpolation nodes $\{T_i\}$ are constructed according to a requirement for the interpolation based on the dense time points $\{t_i\}$; the ephemeris values on the nodes are generated along with the construction process.

Further, in step 4, the interpolation nodes $\{T_i\}$ are specifically constructed as follows:

considering that an even number q of interpolation nodes are required by an odd-order interpolation polynomial for one interpolation, the interpolation nodes are constructed in three cases according to different distribution characteristics of the time points $\{t_i\}$ relative to $t_0$:

1) if $\{t_j^b\}$ and $\{t_k^c\}$ are both non-empty, then $m_j > 0$, $m_k > 0$, and there are time points on both sides of $t_0$; in this case, forward interpolation node construction is performed first; in the forward interpolation node construction process, if $T_i > t_{m_j}^b$ appears for the first time, where $t_{m_j}^b$ is an element in $\{t_j^b\}$, then the construction continues q/2−1 steps along the forward direction, and then switches to backward interpolation node construction; in the backward interpolation node construction process, if $T_i < t_{m_k}^c$ appears for the first time, where $t_{m_k}^c$ is an element in $\{t_k^c\}$, then the construction continues q/2−1 steps along the backward direction, and the entire interpolation node construction process ends;

2) if $\{t_k^c\}$ is empty, then $m_k = 0$, and the time points $\{t_i\}$ are all located in the forward direction of to; in this case, forward interpolation node construction is performed first; in the forward interpolation node construction process, if $T_j > t_{m_j}^b$ appears for the first time, then the construction continues q/2−1 steps along the forward direction; then a number s, s≥0 of interpolation nodes in the backward direction of the time point $t_1^b$ is checked; if s≥q/2, then the entire interpolation node construction process ends; otherwise, the process switches to backward interpolation node construction; in the backward interpolation node construction process, the construction goes q/2−s steps along the backward direction, and the entire interpolation node construction process ends; and 3) if $\{t_j^b\}$ is empty, then $m_j$=0, and the time points $\{t_j\}$ are all located in the backward direction of $t_0$; in this case, backward interpolation node construction is performed first; in the backward interpolation node construction process, if $T_j < t_{m_k}^c$ appears for the first time, then the construction continues q/2−1 steps in the backward direction; then a number s, s≥0 of nodes in the forward direction of the time point $t_1^c$ is checked; if s≥q/2, then the entire interpolation node construction process ends; otherwise, the process switches to forward interpolation node construction; in the forward interpolation node construction process, the construction goes q/2−s steps along the forward direction, and the entire interpolation node construction process ends.

The above three interpolation node construction cases cover all the distribution characteristics of $\{t_i\}$ relative to $t_0$, and the uneven forward or backward interpolation nodes $\{T_l\}$ involved are derived by:

assuming that an interpolation node $T_l$ and its ephemeris values $\vec{R}_l$ and $\dot{\vec{R}}_l$ are known, then calculating the semi-major axis and orbital period of the osculating orbit respectively according to Eqs. (6) and (7):

$$a_l = \frac{\mu R_l}{-\dot{R}_l^2 R_l + 2\mu} \quad (6)$$

$$P_t^l = 2\pi a_l \sqrt{a_l} / \sqrt{\mu} \quad (7)$$

where, μ is geocentric constant of gravitation; $R_l$ is the modulus of $\vec{R}_l$; $P_t^l$ is an orbital period measured by t and calculated according to the ephemeris values of the l-th node $T_l$; values of $a_0$ and $P_t^0$, when l=0, are calculated in step 1;

calculating an interval between $T_l$ and an adjacent interpolation node according to Eq. (8):

$$\Delta T_l = \beta \left(\frac{R_l}{a_l}\right)^{1+\delta} \frac{P_t^l}{N} \quad (8)$$

constructing a forward node $T_{l+1}$ as:

$$T_{l+1} = T_l + \Delta T_l \quad (9)$$

constructing a backward node $T_{l-1}$ as:

$$T_{l-1} = T_l - \Delta T_l \quad (10)$$

Further, in step 4, the ephemeris values on the interpolation node are specifically generated by a numerical integration as follows:

the ephemeris values of the node are generated along with the construction process, and ephemeris values $\vec{R}_{l+1}, \dot{\vec{R}}_{l+1}$ or $\vec{R}_{l-1}, \dot{\vec{R}}_{l-1}$ of the node $T_{l+1}$ or $T_{l-1}$ are derived from $T_l$ to $T_{l+1}$ or $T_{l-1}$ by any single-step method capable of achieving variable-step integration.

Further, in step 5, for any time point $t_i$, q/2 interpolation nodes are respectively taken from both sides of $t_i$; the ephemeris values on these nodes are used to interpolate by the selected interpolation method to obtain ephemeris values $\vec{r}_i$ and $\dot{\vec{R}}_i$ at the time $t_i$; then $\{t_i\}$ is traversed to complete all ephemeris calculations.

Further, in step 5, the selected interpolation method is a Hermite method.

The following introduces the theoretical derivation of the uneven interpolation node construction method, the mathematical proof of the superiority of the method, and the basis for selecting the Hermite method for interpolation.

The space object is more affected by the central gravity of the earth than perturbations since the perturbations are all first- or second-order infinitesimals relative to the central gravity of the earth. Therefore, the motion of the space object can be considered as a two-body motion around the centroid of the earth, and the orbit of the space object is an invariant elliptical orbit. Such a simplification is to facilitate the theoretical derivation and explanation of the technical solution, and to avoid any essential influence on the conclusion to be drawn.

Based on the uniformization concept of Sundman transformation (disclosed in Huang Tianyi, Ding Hua. *Stabilization and transformation of independent variables* [J]. Acta Astronomica SINICA, 1981(4):16-23), which is hereby incorporated by reference, the present disclosure introduces a pseudo-time variable z to construct a transformation relationship between Z and t:

$$dt = \left(\frac{r}{a}\right)^{1+\delta} d\tau \quad (11)$$

where, r is the geocentric distance of the space object; a is the orbital semi-major axis; δ is a transformation parameter with a predetermined value. Let E be the orbital eccentric anomaly of the object and e be the orbital eccentricity, and then substituting an elliptical motion relationship r=a(1−ecosE) into Eq. (11) leads to:

$$dt = (1-e \cos E)^{1+\delta} d\tau \quad (12)$$

Let n be the mean angular velocity of the object, M be the mean anomaly of the object and $t_p$ be a perigee passage time of the object. Differentiating both sides of a Kepler equation E−e sin E=M=n(t−$t_p$) and rearranging lead to:

$$dt = \frac{1 - e\cos E}{n} dE \quad (13)$$

Rearranging Eqs. (12) and (13) leads to:

$$d\tau = \frac{1}{n(1 - e\cos E)^\delta} dE \quad (14)$$

Assume that $P_\tau$ is an orbital period measured by the pseudo-time variable τ and $\tau_p$ is a perigee passage time of the object measured by τ, then integrating one orbital period on both sides of Eq. (14) leads to:

$$\int_{\tau_p}^{\tau_p + P_\tau} d\tau = \int_0^{2\pi} \frac{1}{n(1 - e\cos E)^\delta} dE \quad (15)$$

$$P_\tau = \left(\frac{2\pi}{n}\right)\left(\frac{1}{2\pi}\int_0^{2\pi}\frac{1}{(1-e\cos E)^\delta}dE\right)$$

Introducing an elliptical motion relationship $P_t=2\pi/n$ and assuming $$\beta = \frac{1}{2\pi}\int_0^{2\pi}\frac{1}{(1-e\cos E)^\delta}dE \quad (16)$$

lead to:

$$P_\tau = \beta P_t \quad (17)$$

In Eq. (17), $P_t$ is the orbital period measured by the time variable t; β is an orbital period transformation factor that is determined by the orbital eccentricity e and the transformation parameter δ and is a constant during interpolation node construction.

Assuming that an orbital period with Z as an independent variable has N nodes that are equally spaced, an interval between an l-th node and an (l+1)-th node measured by τ is:

$$\Delta\tau_l = \tau_{l+1} - \tau_l = \frac{P_\tau}{N} \quad (18)$$

where, $P_\tau$ is an orbital period measured by τ, and is a constant in a two-body dynamic model. Substituting Eq. (17) into Eq. (18) leads to:

$$\Delta\tau_l = \beta\frac{P_t}{N} \quad (19)$$

In Eq. (19), $P_t$ is an orbital period measured by t, and is a constant in a two-body dynamic model. $\{T_l\}$ (l=0, 1, 2, 3, . . . ) denotes a set of uneven interpolation nodes. Integrating on both sides of Eq. (11) from the l-th node to the (l+1)-th node leads to:

$$\int_{T_l}^{T_{l+1}} dt = \int_{\tau_l}^{\tau_{l+1}}\left(\frac{r}{a}\right)^{1+\delta} d\tau$$

A mean value theorem is used to obtain:

$$\Delta T_l = \left(\frac{r_\xi}{a}\right)^{1+\delta}\Delta\tau_l \quad (20)$$

where, $r_\xi = r(t_\xi)$, $t_\xi$ is a value between $T_l$ and $T_{l+1}$. If Eq. (20) is used to divide the interpolation nodes according to the time t, the number of nodes included in one orbital period is exactly equal to N. However, because the value of $t_\xi$ is unknown, Eq. (20) cannot be used for actual node division. Therefore, the equation is rewritten as:

$$\Delta T_l = \left(\frac{R_l}{a}\right)^{1+\delta}\Delta\tau_l \quad (21)$$

where, $R_l = r(T_l)$, and $R_l$ can be obtained by a numerical integration when $T_l$ is known. Eq. (21) defines a practically feasible method for interpolation node division, where the total number of nodes included in one orbital period is roughly N. Substituting Eq. (19) into Eq. (21) leads to:

$$\Delta T_l = \beta\left(\frac{R_l}{a}\right)^{1+\delta}\frac{P_t}{N} \quad (22)$$

According to Eq. (22), the interval $\Delta T_l$ between a known node and a subsequent node can be determined based on the ephemeris of the known node. a and $P_t$ can be calculated by the two-body dynamic model, and the ephemeris of the subsequent node can be obtained by performing a variable-step numerical integration for a duration of $\Delta T_l$ forward or backward. This process is carried out recursively until the construction of all interpolation nodes is completed.

In contrast to the uneven interpolation node construction method defined by Eq. (22), an even interpolation node construction method is currently widely used in the navigation satellite ephemeris calculation, and it is expressed by:

$$\Delta T_l = T_{l+1} - T_l = \frac{P_t}{N} \quad (23)$$

where, $T_l$ (l=0, 1, 2, 3, . . . ) is a set of evenly spaced interpolation nodes; $P_t$ is an orbital period measured by the time variable t; N is a number of nodes included in one orbital period; $\Delta T_l$ is an interval between an l-th node and an (l+1)-th node.

The superiority of using Eq. (22) for interpolation node division is proven below by taking Lagrange interpolation as an example. Assuming that the interpolation polynomial is of q-order, considering the left-right symmetry of the number of nodes during interpolation, q is taken as an odd number, and the number of interpolation nodes of the q-order Lagrange polynomial is q+1. The q+1 interpolation nodes are different from each other and are arranged from small to large as follows:

$$T_0, T_1, T_2, \ldots, T_q$$

Without loss of generality, an X-axis coordinate component of a position vector is taken as an example for illustration, and the rest is analogous. According to an interpolation theory (disclosed by Li Qingyang. *Principles of Numerical Calculation* [M]. Tsinghua University Press, 2000), a remainder of the q-order Lagrange polynomial is:

$$G(t) = \frac{x^{(q+1)}(t_\xi)}{(q+1)!}A(t) \quad (24)$$

$$T_0 \le t_\xi \le T_q$$

$$A(t) = \prod_{i=0}^{q}(t - T_i) \quad (25)$$

It can be seen from Eqs. (24) and (25) that a change in an interpolation error is reflected in the value of A(t), which is related to the node division method. The following shows the influences of node division according to Eqs. (22) and (23) on the interpolation accuracy.

Assuming that a time point t is located between $T_{k-1}$ and $T_k$, $T_{k-1} < t < T_k$, then in order to make the time point at an intermediate position of the nodes, let $k=(q+1)/2$. Defining $\epsilon$ as follows:

$$\epsilon = \frac{T_k - t}{T_k - T_{k-1}}$$

$$0 < \epsilon < 1$$

If even nodes divided by Eq. (23) are used, it is obvious that:

$$t - T_j = (k - \epsilon - j)\frac{P_t}{N} \qquad (26)$$

$$j = 0, 1, 2, \ldots, q$$

Substituting Eq. (26) into Eq. (25) leads to:

$$A(t) = \left(\prod_{i=0}^{q}(k - \epsilon - i)\right)\left(\frac{P_t}{N}\right)^{q+1} \qquad (27)$$

Substituting Eq. (27) into Eq. (24) leads to:

$$G(t) = \frac{\prod_{i=0}^{q}(k - \epsilon - i)}{(q+1)!}\left(\frac{P_t}{N}\right)^{q+1} x^{(q+1)}(t_\xi) \qquad (28)$$

$$T_0 \leq t_\xi \leq T_q$$

If uneven interpolation nodes divided by Eq. (22) are used, for the convenience of theoretical derivation, two theorems derived from the mean value theorem are first given. Let f(t) be a continuous function of the time t, f(t)>0, $\beta_1, \beta_2, \ldots, \beta_m$ be a set of positive real numbers, and $t_1, t_2, \ldots, t_m$ be m different time points that are arranged from small to large, then $$\Pi_{i=1}^{m}\beta_i f(t_i) = (\Sigma_{i=1}^{m}\beta_i) f(t_\xi) \quad t_1 \leq t_\xi \leq t_m \qquad (29)$$

$$\Pi_{i=1}^{m} f(t_i) = (f(t_\xi))^m \quad t_1 \leq t_\xi \leq t_m \qquad (30)$$

In the derivative process, assume that $$f(t) = \left(\frac{r}{a}\right)^{1+\delta}$$

where, f(t) is a continuously differentiable function of the time t, f(t)>0. It can easily be derived from Eq. (29) that:

$$t - T_j = \beta\left(\frac{r_{\xi_j}}{a}\right)^{1+\delta}(k - \epsilon - j)\frac{P_t}{N} \qquad (31)$$

$$j = 0, 1, 2, \ldots, q$$

where, $r_{\xi_j} = r(t_{\xi_j})$, $T_0 \leq t_{\xi_j} \leq T_q$. Substituting Eq. (31) into Eq. (25) and rearranging with Eq. (30) lead to:

$$A(t) = \beta^{q+1}\left(\frac{r_{\xi^*}}{a}\right)^{(q+1)(1+\delta)}\left(\prod_{i=0}^{q}(k - \epsilon - i)\right)\left(\frac{P_t}{N}\right)^{q+1} \qquad (32)$$

where, $r_{\xi_j} = r(t_{\xi_j})$, $T_0 \leq t_{\xi_j} \leq T_q$. Substituting Eq. (32) into Eq. (24) leads to:

$$G(t) = \beta^{q+1}\frac{\prod_{i=0}^{q}(k - \epsilon - i)}{(q+1)!}\left(\frac{P_t}{N}\right)^{q+1}\left(\frac{r_{\xi^*}}{a}\right)^{(q+1)(1+\delta)} x^{(q+1)}(t_\xi) \qquad (33)$$

$$T_0 \leq t_\xi, t_{\xi^*} \leq T_q$$

A two-body dynamic equation is introduced:

$$\ddot{x} = -\frac{\mu}{r^3}x$$

A higher-order derivative of the above equation with respect to x yields:

$$x^{(q+1)}(t_\xi) = Hx_\xi + Q\dot{x}_\xi \qquad (34)$$

where, $x_\xi = x(t_\xi)$, $\dot{x}_\xi = \dot{x}(t_\xi)$, and $$H \sim 1/\left(\frac{r_\xi}{a}\right)^{2q+1}$$

$$Q \sim 1/\left(\frac{r_\xi}{a}\right)^{2q-1}$$

where, $r_\xi = r(t_\xi)$. For any one of the above interpolation node division methods, it can be seen from Eqs. (24) and (34) that when interpolating near the perigee, the interpolation error is larger because of larger $x^{(q+1)}(t_\xi)$, and when interpolating near the apogee, the interpolation error is smaller because of smaller $x^{(q+1)}(t_\xi)$. This may adversely affect the actual application. Generally, the excessively large interpolation error near the perigee will cause the ephemeris calculation to fail to meet the accuracy requirement, and the excessively small interpolation error near the apogee is not necessary in an actual application that requires a general accuracy.

It can be seen from Eq. (28) that the evenly spaced interpolation node division method cannot effectively solve the problem of poor interpolation accuracy near the perigee. The only way is to increase N such that the distribution density of the interpolation nodes near the perigee increases. However, as N increases, the total number of the interpolation nodes increases, resulting in an increase in the calculation times of the right function required for numerical integration, which will seriously reduce the ephemeris calculation efficiency. Therefore, the evenly spaced node division method of Eq. (23) is not suitable for the ephemeris calculation of the high-eccentricity orbit.

It can be seen from Eq. (33) that $t_{\xi^*}$ and $t_\xi$ are in the range $[T_0, T_q]$ of the nodes of the interpolation polynomial, and the interval between the two is small, so the difference between $r_{\xi^*}$ and $r_\xi$ is also small. Due to the existence of the factor $$\gamma = \left(\frac{r_{\xi^*}}{a}\right)^{(q+1)(1+\delta)} \qquad (35)$$

the multiplication of $\gamma$ and $x^{(q+1)}(t_\xi)$ is equivalent to reducing the power of $(r_\xi/a)$ in the denominators of H and Q, such that the distribution of the interpolation errors on the orbit is more uniform, and the rapid growth of the interpolation errors near the perigee is effectively suppressed, thereby significantly improving the ephemeris calculation accuracy near the perigee. The above analysis further shows theoretically the superiority of the unevenly spaced interpolation node division method of Eq. (22) for the ephemeris calculation of the high-eccentricity orbit.

The above only takes Lagrange interpolation as an example for theoretical analysis and explanation. Essentially the same as the Lagrange polynomial, other similar interpolation methods with the same order, such as Newton and Neville polynomials, correspond to the same interpolation remainder and nodes. Therefore, the above error analysis conclusions are also applicable to the Newton and Neville polynomials.

For the Hermite polynomial, assuming that the Hermite interpolation polynomial is also of q-order, considering the left-right symmetry of the number of nodes during interpolation, q is taken as an odd number, q=4j−1, where j is a positive integer. Then, the number of interpolation nodes of the q-order Hermite polynomial is q'+1, where $$q' = \frac{q+1}{2} - 1 \tag{36}$$

The corresponding interpolation nodes are arranged from small to large as follows:

$$T_0, T_1, T_2, \ldots, T_{q'}$$

According to the interpolation theory (disclosed by Li Qingyang. *Principles of Numerical Calculation* [M]. Tsinghua University Press, 2000), a remainder of the q-order Hermite polynomial is:

$$G(t) = \frac{x^{(q+1)}(t_\xi)}{(q+1)!} A^2(t) \tag{37}$$

$$T_0 \leq t_\xi \leq T_{q'}$$

$$A(t) = \prod_{i=0}^{q} (t - T_i) \tag{38}$$

It can be seen from Eqs. (37) and (38) that the properties of the remainder of the Hermite polynomial are basically the same as those of the above-mentioned interpolation polynomials. Therefore, the above error analysis means can also apply to the Hermite method.

For the Hermite method, if the same set of interpolation nodes divided by Eq. (22) are used, the derivation process above can similarly lead to:

$$A(t) = \alpha^{q'+1} \left(\frac{r_{\xi*}}{a}\right)^{(q'+1)(1+\delta)} \left(\prod_{i=0}^{q'} (k' - \epsilon - i)\right) \left(\frac{P_t}{N}\right)^{q'+1} \tag{39}$$

where, $k'=(q+1)/4$, $T_0 \leq t_{\xi*} \leq T_{q'}$. Substituting Eq. (39) into Eq. (37) and rearranging with Eq. (36) lead to:

$$G(t) = \alpha^{q+1} \frac{\left[\prod_{i=0}^{q'} (k' - \epsilon - i)\right]^2}{(q+1)!} \left(\frac{P_t}{N}\right)^{q+1} \left(\frac{r_{\xi*}}{a}\right)^{(q+1)(1+\delta)} x^{(q+1)}(t_\xi) \tag{40}$$

Because of q'+1=(q+1)/2, it is evident that:

$$[\Pi_{i=0}^{q'}(k'-\epsilon-i)]^2 \leq \Pi_{i=0}^{q}(k-\epsilon i) \tag{41}$$

Rearranging with Eqs. (34) and (35) leads to:

$$\gamma x^{(q+1)}(t_\xi) = (\gamma H) x_\xi + (\gamma Q) \dot{x}_\xi \tag{42}$$

Where $$\gamma H \sim \left(\frac{r_{\xi*}}{r_\xi}\right)^{(q+1)(1+\delta)} \left[1 / \left(\frac{r_\xi}{a}\right)^{(2q+1)-(q+1)(1+\delta)}\right]$$

$$\gamma Q \sim \left(\frac{r_{\xi*}}{r_\xi}\right)^{(q+1)(1+\delta)} \left[1 / \left(\frac{r_\xi}{a}\right)^{(2q-1)-(q+1)(1+\delta)}\right]$$

Let $\zeta = r_{\xi*}/r_\xi$. It can be seen from Eq. (42) that the change of $\zeta$ will affect the evenness of the interpolation error distributed on the orbit. Therefore, like $\delta$, $\zeta$ is also an index that determines the evenness of the interpolation error. Due to the indetermination of $t_\xi$ and $t_{\xi*}$, $\zeta$ changes around 1, but the change can't be determined accurately. Nonetheless, compared with other interpolation polynomials, the number of interpolation nodes used by the Hermite polynomial of the same order is greatly reduced, that is, only half that of other polynomials, and the time range covered by the interpolation polynomial nodes is also greatly reduced. Since $t_\xi$ and $t_{\xi*}$ fall within the range covered by the interpolation polynomial nodes, the difference between $r_\xi$ and $r_{\xi*}$ in the Hermite method is relatively small, and the amplitude of the change of $\zeta$ around 1 is greatly reduced. This shows that the Hermite method is more conducive to the even distribution of the interpolation error.

It can be seen from Eqs. (41) and (42) that the Hermite interpolation adopted by the present disclosure can significantly improve the ephemeris calculation accuracy of the high-eccentricity orbit. Further, in the case of requiring a specified accuracy, the Hermite interpolation can reduce the requirement for the node distribution density, that is, N in Eq. (22) can take a smaller value. In this case, the number of nodes is reduced, and thus the calculation efficiency is significantly improved, which has been verified in the numerical experiment. Therefore, the present disclosure employs the Hermite method as the interpolation method.

The technical solution of the present disclosure is theoretically explained above based on the two-body dynamic model. When considering the influence of perturbation, since the orbital semi-major axis a and the eccentricity e have no obviously long-term variation, they will not affect the reasonable construction of Eq. (22), that is, the basic composition of the technical solution of the present disclosure. The perturbation does not affect the derivation of the above theoretical conclusions except for the ephemeris accuracy. Taking the main perturbation term, namely the major harmonics perturbation J2 of the earth's gravitational field, as an example, if only the J2 perturbation is considered, it can be derived from Eq. (34) that:

$$H \sim 1 / \left(\frac{r_\xi}{a}\right)^{2q+1} + J_2 / \left(\frac{r_\xi}{a}\right)^{2q+5}$$

-continued
$$Q \sim 1 \Big/ \left(\frac{r_\varepsilon}{a}\right)^{2q-1} + J_2 \Big/ \left(\frac{r_\varepsilon}{a}\right)^{2q+3}$$

Although higher powers of ($r_\varepsilon/a$) appear in the denominators of H and Q, because $J_2$ is a first-order infinitesimal, $J_2 \sim 10^{-3}$, the interpolation error generated by this perturbation is restricted from increasing more drastically near the perigee. For the actual orbit type (e<0.9), the interpolation error near the perigee caused by the perturbation is at roughly the same order as that near the perigee caused by the two-body motion. Therefore, the actual application effect of the present disclosure is not greatly affected by perturbation.

The present disclosure has the following advantages. The method proposed by the present disclosure has a rigorous theoretical basis and a reliable experimental basis, and its main innovations can be summarized as follows:

1) With respect to the ephemeris calculation of the high-eccentricity orbit, the present disclosure constructs uneven interpolation nodes through a time transformation method and interpolates by an interpolation polynomial based on the uneven interpolation nodes to obtain a dense ephemeris, which significantly improves the calculation efficiency and accuracy of the high-eccentricity orbit.

2) Based on a large-scale numerical experiment, the present disclosure derives an optimal universal value (0.3) of the transformation parameter δ for all orbital eccentricities and various interpolation polynomials.

3) In the case of using the optimal universal value of the transformation parameter δ, the present disclosure further verifies the Hermite interpolation polynomial as the preferable one among the various interpolation polynomials by comparing their calculation efficiency.

DETAILED DESCRIPTION OF THE EMBODIMENTS

The present disclosure is described in more detail below with reference to the drawings.

Figure 1:
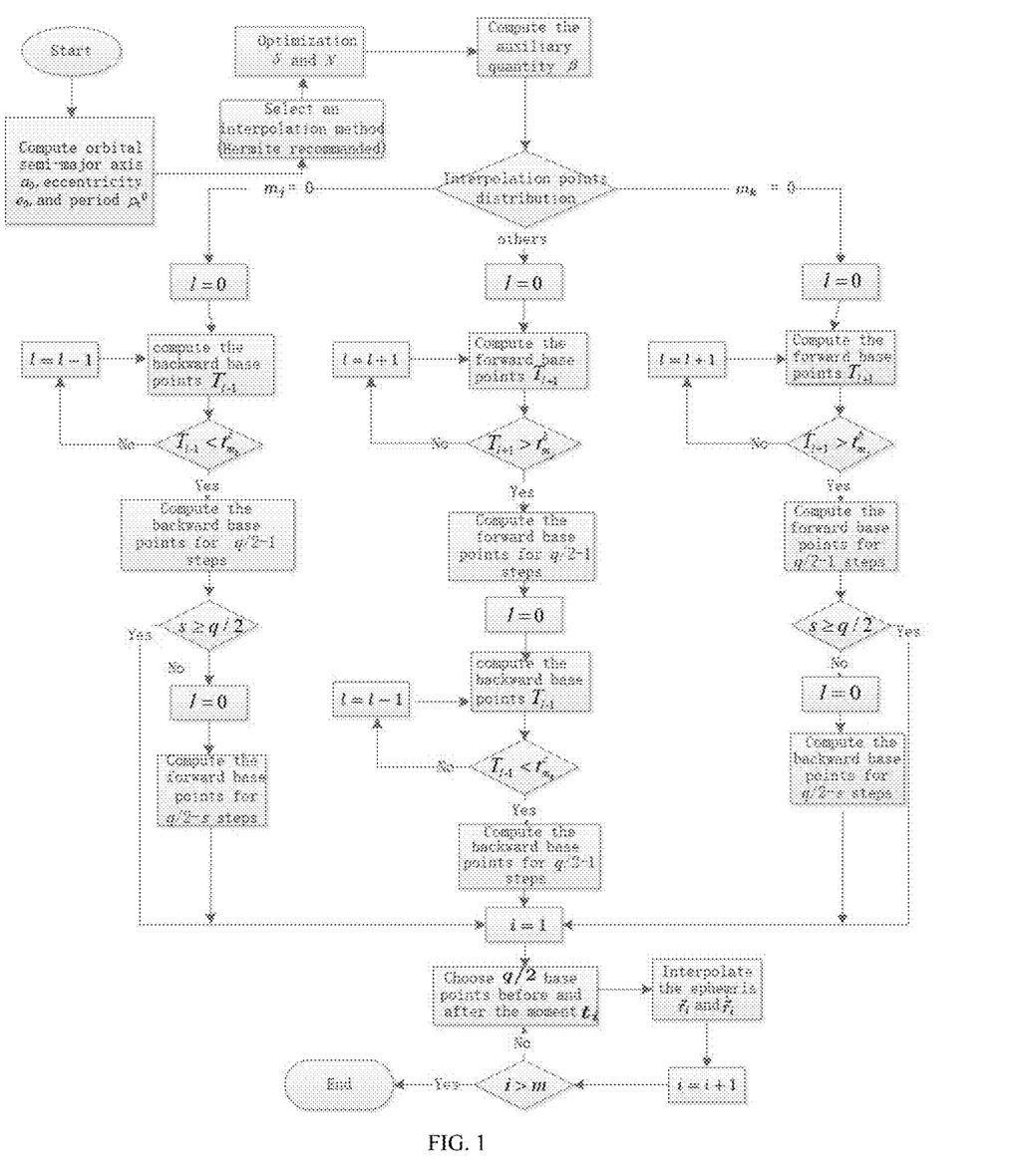
FIG. 1 shows a flowchart of the method for dense ephemeris computation.
Figure 2:
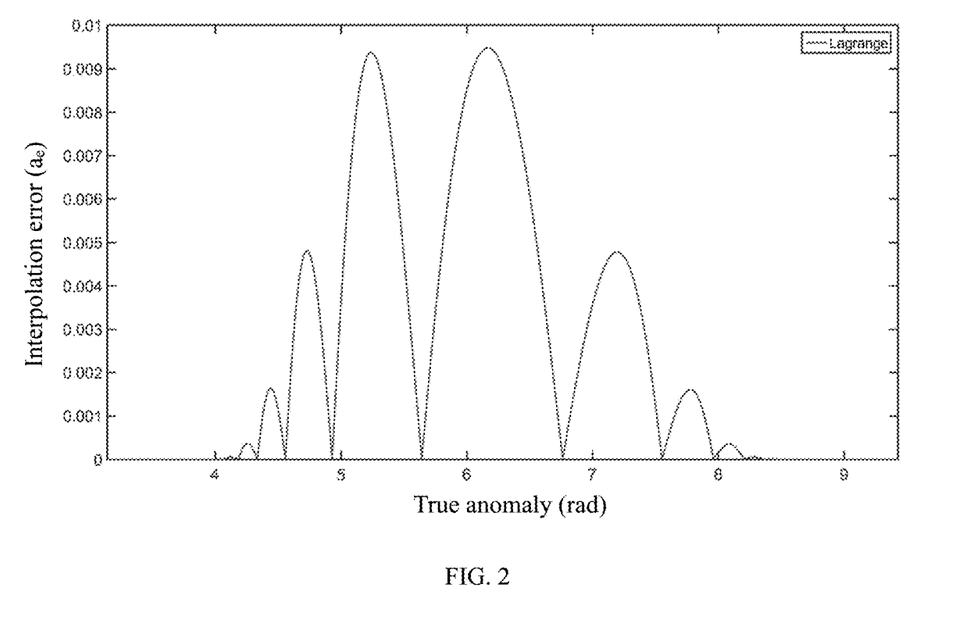
FIG. 2 shows interpolation errors of object positions within an orbital period based on even nodes.
Figure 3:
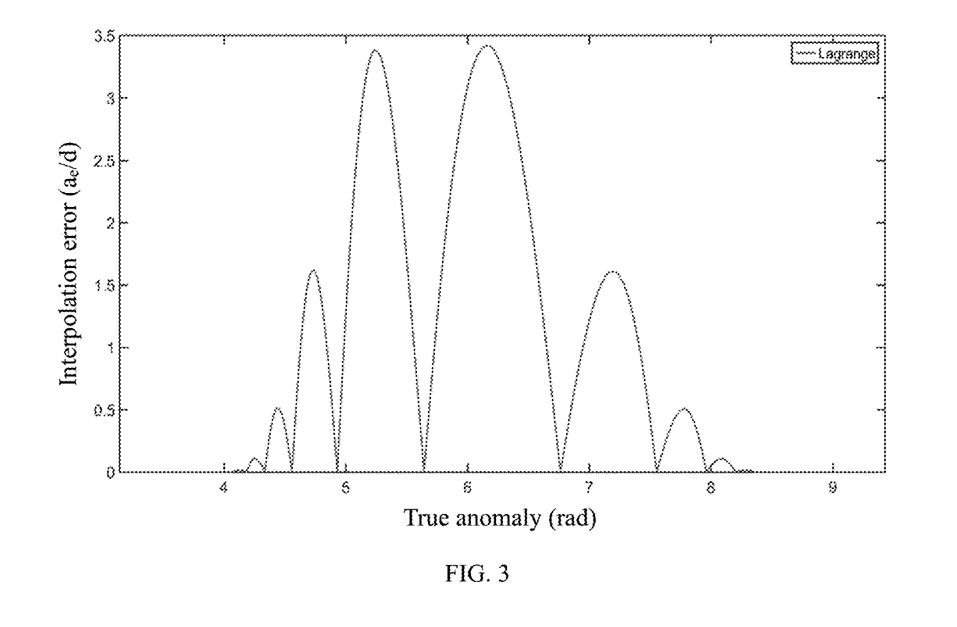
FIG. 3 shows interpolation errors of object velocities within an orbital period based on even nodes.

A dense ephemeris calculation method, as shown in FIG. 1, implements the ephemeris calculation of a space object by solving a dynamic equation as follows:

$$\ddot{\vec{r}} = \vec{F}(\vec{r}, \dot{\vec{r}}, t) = \vec{F}_0(\vec{r}) + \vec{F}_\varepsilon(\vec{r}, \dot{\vec{r}}, t)$$

where $\vec{F}$ represents a synthetic force acting on the object; $\vec{F}_0$ represents the central gravity of the earth; $\vec{F}_\varepsilon$ represents the perturbations. A position vector $\vec{r}(t_0) = \vec{r}_0$ and a velocity vector $\dot{\vec{r}}(t_0) = \dot{\vec{r}}_0$ of the object at an epoch $t_0$ are known. $t_i$ (i=1, 2, 3, ... m) represents a set of designated densely distributed time points. The calculation of the dense ephemeris comes down to calculating a position vector $\vec{r}(t_i) = \vec{r}_i$ and a velocity vector $\dot{\vec{r}}(t_i) = \dot{\vec{r}}_i$ of the object at $t_i$ from the known $\vec{r}_0$ and $\dot{\vec{r}}_0$. Generally, since $t_0$ may be between the minimum value of $\{t_i\}$ and the maximum value of $\{t_i\}$, for convenience of description, $\{t_i\}$ is divided into $\{t_j^b\}$ and $\{t_k^c\}$. $\{t_j^b\}$ includes $m_j$ elements increasing monotonously under a subscript j, wherein $m_j \geq 0$ and $t_0 < t_j^b$. $\{t_k^c\}$ includes $m_k$ elements decreasing monotonically under a subscript k, wherein $m_k \geq 0$, $t_0 > t_k^c$, and $m_j + m_k = m$.

It is difficult to balance the calculation accuracy and calculation efficiency of the above-mentioned dense ephemeris of the high-eccentricity orbit through the existing interpolation methods. When the number of interpolation nodes is fixed, the interpolation nodes evenly spaced by time intervals may cause a reduction in the interpolation accuracy near the perigee due to the sparse interpolation nodes, and an increase in the interpolation accuracy near the apogee due to the dense interpolation nodes, which shows an imbalance problem. Increasing the number of interpolation nodes can solve this imbalance problem, but the numerical integration time will be prolonged, which is likely to cause low calculation efficiency. In order to balance the calculation accuracy and calculation efficiency of the ephemeris of the high-eccentricity orbit, the present disclosure proposes an uneven interpolation node construction method to coordinate with the Hermite interpolation polynomial to carry out dense ephemeris interpolation. This technical solution can be used in coordination with a general single-step integration method in the ephemeris calculation process, and can meet the high-accuracy and high-efficiency requirements of the dense ephemeris calculation of the high-eccentricity orbit. Based on an uneven interpolation node construction theory, the present disclosure proposes an interpolation node construction equation as:

$$\Delta T_l = \beta \left(\frac{R_l}{a}\right)^{1+\delta} \frac{P_t}{N}$$

Correspondingly, an even interpolation node construction equation is;

$$\Delta T_l = T_{l+1} - T_l = \frac{P_t}{N}$$

The meaning of each symbol is described in the derivation process, and will not be repeated here. It needs to be pointed out that δ and N are constants predetermined before the interpolation nodes are constructed. δ and N affect the construction method of the interpolation nodes, and further affect the calculation accuracy and efficiency of the dense ephemeris points, so they need to be described in detail, but for convenience of description, the present disclosure only provides the numerical experimental results of δ and the determination method of N.

1. The value of δ determines the difference in the interpolation accuracy near the perigee and near the apogee. By reasonably selecting the value of δ in a suitable value range of [−1,1], the ephemeris calculation error can be more uniformly distributed on the entire orbit. A large number of numerical experimental results show that the optimal universal value for all orbital eccentricities and various interpolation polynomials is 0.3 (see Table 1).

2. Under a certain interpolation accuracy requirement, corresponding to the known e and δ, there must be a minimum N capable of maximizing the calculation efficiency. Therefore, a numerical experiment is carried out to find the minimum N and make a table. The value of N can be determined by consulting the table.

TABLE 1

Optimal δ and minimum N for position interpolations of different eccentricities by different interpolation methods
(Runge-Kutta-Felhberg (RKF8 (7)) integrator, requiring position interpolation accuracy greater than $10^{-7} a_e$)

| | Lagrange (9-degree) | | Newton (9-degree) | | Neville (9-degree) | | Hermite (7 degree) | |
|---|---|---|---|---|---|---|---|---|
| e | δ | N | δ | N | δ | N | δ | N |
| 0.00 | −1.0-1.0 | 16 | −1.0-1.0 | 16 | −1.0-1.0 | 16 | −1.0-1.0 | 12 |
| 0.05 | −0.2-1.0 | 19 | −0.2-1.0 | 19 | −0.2-1.0 | 19 | −0.4-1.0 | 13 |
| 0.10 | 0.7-1.0 | 22 | 0.7-1.0 | 22 | 0.7-1.0 | 22 | 0.1-1.0 | 14 |
| 0.15 | 0.5-1.0 | 24 | 0.5-1.0 | 24 | 0.5-1.0 | 24 | −0.1-1.0 | 16 |
| 0.20 | 0.3-1.0 | 26 | 0.3-1.0 | 26 | 0.3-1.0 | 26 | −0.1-1.0 | 17 |
| 0.25 | 0.5-0.9 | 28 | 0.5-0.9 | 28 | 0.5-0.9 | 28 | 0.2-0.9 | 19 |
| 0.30 | 0.2-0.4 | 31 | 0.2-0.4 | 31 | 0.2-0.4 | 31 | 0.1-0.8 | 20 |
| 0.35 | 0.4-0.5 | 40 | 0.4-0.5 | 40 | 0.4-0.5 | 40 | 0.3-0.5 | 21 |
| 0.40 | 0.2-0.6 | 33 | 0.2-0.6 | 33 | 0.2-0.6 | 33 | 0.2-0.4 | 23 |
| 0.45 | 0.3-0.4 | 38 | 0.3-0.4 | 38 | 0.3-0.4 | 38 | 0.2-0.4 | 24 |
| 0.50 | 0.3-0.5 | 41 | 0.3-0.5 | 41 | 0.3-0.5 | 41 | 0.3 | 26 |
| 0.55 | 0.3 | 43 | 0.3 | 43 | 0.3 | 43 | 0.3 | 27 |
| 0.60 | 0.3 | 46 | 0.3 | 46 | 0.3 | 46 | 0.3 | 29 |
| 0.65 | 0.3 | 50 | 0.3 | 50 | 0.3 | 50 | 0.3 | 32 |
| 0.70 | 0.3 | 54 | 0.3 | 54 | 0.3 | 54 | 0.3 | 35 |
| 0.75 | 0.3 | 59 | 0.3 | 59 | 0.3 | 59 | 0.3 | 40 |
| 0.80 | 0.3 | 65 | 0.3 | 65 | 0.3 | 65 | 0.3 | 43 |
| 0.85 | 0.3 | 77 | 0.3 | 77 | 0.3 | 77 | 0.3 | 53 |
| 0.90 | 0.3 | 115 | 0.3 | 115 | 0.3 | 115 | 0.3 | 54 |

Note:
$a_e$ = 6378136 m. The optimal δ for the smaller-eccentricity orbit is given in a range, and any δ in this range can lead to the minimum N capable of meeting the accuracy requirement.

The technical solution of dense ephemeris calculation is described below with reference to an embodiment.

Embodiment: The orbital elements of a space object at an epoch $t_0$=58362.0 (modified Julian date (MJD)) are known: the semi-major axis a=5.25$a_e$ ($a_e$ is an equatorial radius of a reference ellipsoid, which is 6378136 m), the eccentricity e=0.8 (the values of a and e in Case 3 are different from these values, see the description of Case 3 for details), the orbital inclination angle: i=45°; the right ascension of ascending node: Ω=0°; the argument of perigee: ω=0°; the mean anomaly: M=0°. The orbital elements can be converted to obtain a position vector $\vec{r}_0$ and a velocity vector $\dot{\vec{r}}_0$ at the epoch $t_0$, and the conversion method will not be repeated here. The time points to generate the dense ephemeris are $\{t_i\}$ (i=1, 2, 3, ... m), where $t_1=t_0+P_0/2$, $t_m=t_0+3P_0/2$, lasting one orbital period $P_0$ and the interval between intermediate points is 1 s.

Case 1: The even time interval method (commonly used in navigation satellite ephemerides) and the uneven interval method proposed by the present disclosure are used to construct interpolation nodes, wherein the number N of interpolation nodes is 80, and the optimal universal value of δ is 0.3. After that, the $9^{th}$-degree Lagrange polynomial is used for interpolation, so as to compare the effects of the two interpolation node construction methods on the ephemeris calculation accuracy.

Case 2: δ is set as the optimal universal value of 0.3. The uneven interpolation node construction method proposed by the present disclosure in coordination with the $9^{th}$-degree Lagrange polynomial (N=114) and the $7^{th}$-degree Hermite polynomial (N=60), respectively, is used for interpolation, so as to compare the ephemeris calculation accuracy of the two interpolation methods.

Case 3: δ is set as the optimal universal value of 0.3. A point-to-point integration method and the uneven node interpolation method (using the Hermite interpolation polynomial) proposed by the present disclosure are used to calculate the ephemeris of orbits with different eccentricities, wherein the eccentricity e increases from 0 to 0.9 by an increment of 0.05, a is obtained by the constraint a(1−e)= 1.05$a_e$; the other orbital parameters remain unchanged, and a total of 19 sets of orbital elements are generated. The two methods are compared in the calculation times of the integral right function and the calculation time by a central processing unit (CPU).

The dense ephemeris calculation in the embodiment comprehensively integrates dynamic equation solving and ephemeris interpolating two technologies. The position vector $\dot{r}_0$ and velocity vector $\ddot{\vec{r}}_0$ at $t_0$ are known, and dynamic models used for the orbital calculation include: the earth's gravitational field being GRIM4_S4 model (8×8); the atmospheric density model being DTM94 (disclosed by C. Berger, R. Biancale, M. Ill, et al. *Improvement of the empirical thermospheric model DTM: DTM94—a comparative review of various temporal variations and prospects in space geodesy applications* [J]. Journal of Geodesy, 72(3): 161-178); and the position calculation of the sun and moon being Jean Meeus' analysis formula (disclosed by Meeus J. *Astronomical formulae for calculators* [M]. Tweede Druk, 1979). During interpolation, the ephemeris values on the interpolation node are generated by RKF8 (7) integrator capable of achieving variable-step integration. The truncation error of each step of integration is controlled to be $10^{-10}a_e$ for position and $10^{-10}$ $a_e$/day for velocity. In addition, in order to evaluate the interpolation error, the standard ephemeris values $\vec{r}_i^s$ and $\dot{\vec{r}}_i^s$ on $\{t_i\}$ are obtained by variable-step point-to-point integration by RKF8 (7). In Case 1 and Case 2, the truncation error of the point-to-point integration is controlled to be $10^{-10} a_e$ for position and $10^{-10}$ a_e/day for velocity. In Case 3, the truncation error of point-to-point integration is controlled to be $10^{-8} a_e$ for position and $10^{-7}$ a_e/day for velocity. The interpolation errors of the position vector $\vec{r}_i$ and the velocity vector $\dot{\vec{r}}_i$ at each ephemeris point are:

$$\begin{cases} \Delta \vec{r}_i = |\vec{r}_i - \vec{r}_i^s| \\ \Delta \dot{\vec{r}}_i = |\dot{\vec{r}}_i - \dot{\vec{r}}_i^s| \end{cases}$$

The even interpolation node construction method involved in Case 1 has nothing to do with the technical solution of the present disclosure, and its implementation process and steps will not be described in detail here. The following only elaborates on the technical solution proposed by the present disclosure:

Step 1: Calculating initial values, including a semi-major axis $a_0$, an orbital period $P_t^0$ and an eccentricity $e_0$ of an osculating orbit of a space object at a time $t_0$ as follows.

$$a_0 = \frac{\mu r_0}{-\dot{r}_0^2 r_0 + 2\mu}$$

$$P_t^0 = 2\pi a_0 \sqrt{a_0} / \sqrt{\mu}$$

$$e_0 \sqrt{1 - |\vec{r}_0 \times \dot{\vec{r}}_0|^2 / \mu a_0}$$

where, $\mu$ is a geocentric constant of gravitation, which is $0.39860043770442 \times 10^{15}$ m$^3$/s$^2$ In this embodiment, the orbital eccentricity of the space object is 0.8, which indicates that the orbit is a high-eccentricity orbit.

Step 2: Introducing a transformation parameter $\delta$ to express an orbital period transformation factor $\beta$, and obtaining $\beta$ by performing a definite integration as follows:

$$\beta = \frac{1}{2\pi} \int_0^{2\pi} \frac{1}{(1 - e \cos E)^\delta} dE$$

In this embodiment, the optimal universal value of $\delta$ is 0.3, and the value of eccentricity e is substituted by $e_0$. $\beta$ can be calculated by using any definite integration method, and the Simpson method is used in this embodiment.

Step 3: Determining the number N of uneven interpolation nodes in one orbital period.

The number N of interpolation nodes has been given in Case 1 and Case 2, so no calculation is needed therein. In Case 3, $\delta$ is set as the optimal universal value of 0.3, and the Hermite $7^{th}$-degree polynomial is used for interpolation. For the 19 sets of eccentricities e, the minimum N capable of meeting the ephemeris calculation accuracy requirement is determined through a numerical experiment (see Table 2)

TABLE 2

Numerical experimental results of minimum N for orbits of different eccentricities in Case 3
(Requiring position interpolation accuracy greater than $10^{-7}$ a_e and velocity interpolation accuracy greater than $10^{-6}$ a_e/day)

| e | 0.0 | 0.05 | 0.1 | 0.15 | 0.2 | 0.25 | 0.3 | 0.35 | 0.4 | 0.45 | 0.5 | 0.55 | 0.6 | 0.65 | 0.7 | 0.75 | 0.8 | 0.85 | 0.9 |
|---|---|---|---|---|---|---|---|---|---|---|---|---|---|---|---|---|---|---|---|
| N | 18 | 19 | 22 | 24 | 26 | 28 | 30 | 33 | 35 | 37 | 42 | 43 | 46 | 50 | 55 | 59 | 65 | 73 | 75 |

Step 4: Constructing a set of uneven interpolation nodes $\{T_l\}$ from an initial node $t_0$, and generating ephemeris values on the set of interpolation nodes by numerical integration.

In this embodiment, all the ephemeris points $\{t_i\}$ are located on the right of $t_0$, so forward interpolation node construction is performed first. $t_0$ is taken as an initial interpolation node, and ephemeris values at the initial interpolation node are known, $T_0 = t_0$, $\vec{R}_0 = \vec{r}_0$, $\dot{\vec{R}}_0 = \dot{\vec{r}}_0$. The rest of the interpolation nodes are constructed recursively as follows.

Assuming that the l-th node $T_l$ and corresponding ephemeris values $\vec{R}_l$ and $\dot{\vec{R}}_l$ thereon are known, then the semi-major axis and orbital period of the osculating orbit are calculated according to the following equations:

$$a_l = \frac{\mu R_l}{-\dot{R}_l^2 R_l + 2\mu}$$

$$P_t^l = 2\pi a_l \sqrt{a_l} / \sqrt{\mu}$$

where, $R_l$ is the modulus of $\vec{R}_l$. When l=0, $a_0$ and $p_t^0$ are calculated in Step 1. According to the known N, an interval between the l-th node $T_l$ and an (l+1)-th node $T_{l+1}$ is calculated as follows:

$$\Delta T_l = \beta \left(\frac{R_l}{a_l}\right)^{1+\delta} \frac{P_t^l}{N}$$

The (l+1)-th node can be derived according to the following equation:

$$T_{l+1} = T_l + \Delta T_l$$

By taking the ephemeris values $\vec{R}_l$ and $\dot{\vec{R}}_l$ on the l-th node as initial values, a variable-step integration is performed through RKF8(7) from $T_l$ to $T_{l+1}$ to obtain the ephemeris values $\vec{R}_{l+1}$ and $\dot{\vec{R}}_{l+1}$ on the (l+1)-th node. At the same time, $\ddot{\vec{R}}_l = \vec{F}(\vec{R}_l, \dot{\vec{R}}_l, T_l)$ is calculated. In the forward recursion process, every time a new interpolation node $T_l$ is generated, it is necessary to determine whether $T_l > t_m$ is satisfied. If not, the forward construction process continues. If yes, (q/2−1) interpolation nodes are constructed forward based on the current interpolation node, and the forward construction process ends. Then the number s of nodes on the left of $t_1$ is checked. Because $t_1$ and $t_0$ are separated by half an orbital period, and s>>q/2, there is no need to carry out backward node construction, and the entire interpolation node construction process ends.

When the $9^{th}$-degree Lagrange polynomial is used for interpolation, the number q of nodes required for one interpolation is 10. When the $7^{th}$-degree Hermite interpolation polynomial is used, the number q of nodes required for one interpolation is only 4.

Step 5: performing interpolations on dense time points $\{t_i\}$ according to the set of uneven interpolation nodes $\{T_j\}$ and the ephemeris values thereof, so as to complete all ephemeris calculations.

For any time point $t_i$, q/2 interpolation nodes on the left and right of $t_i$, respectively, are taken, and the ephemeris values $\vec{R}_j$ and $\vec{R}^*_j$ on these nodes are used for interpolation to obtain ephemeris values $\vec{r}_i$ and $\vec{r}^*_i$ at $t_i$ ($\vec{R}^*_j$ is further used in case of the Hermite interpolation polynomial). Similarly, $\{t_i\}$ is traversed to complete all ephemeris calculations by the above interpolation process.

The calculation results of Cases 1 to 3 are shown in FIGS. 2 to 7 and Table 3.

Figure 4:
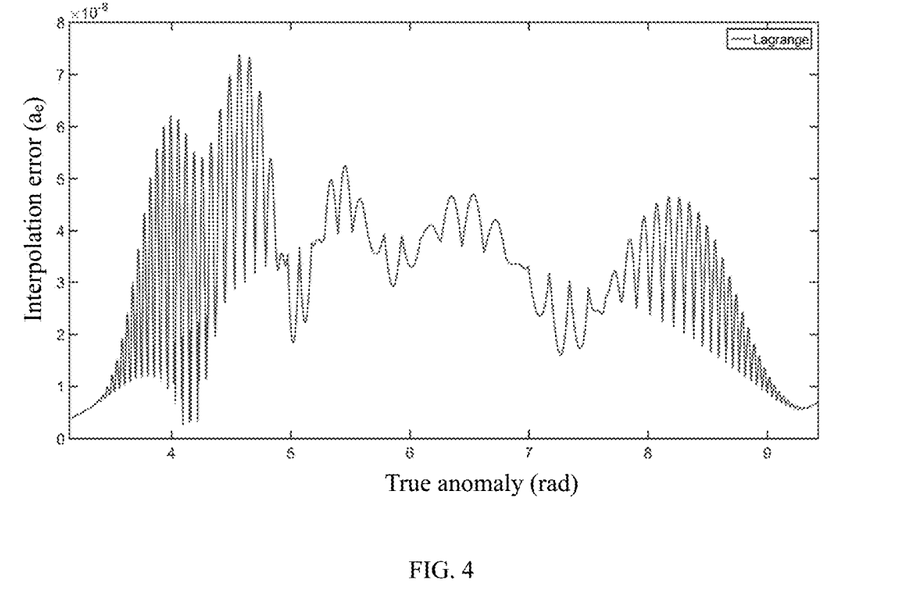
FIG. 4 shows interpolation errors of object positions within an orbital period based on uneven nodes.
Figure 5:
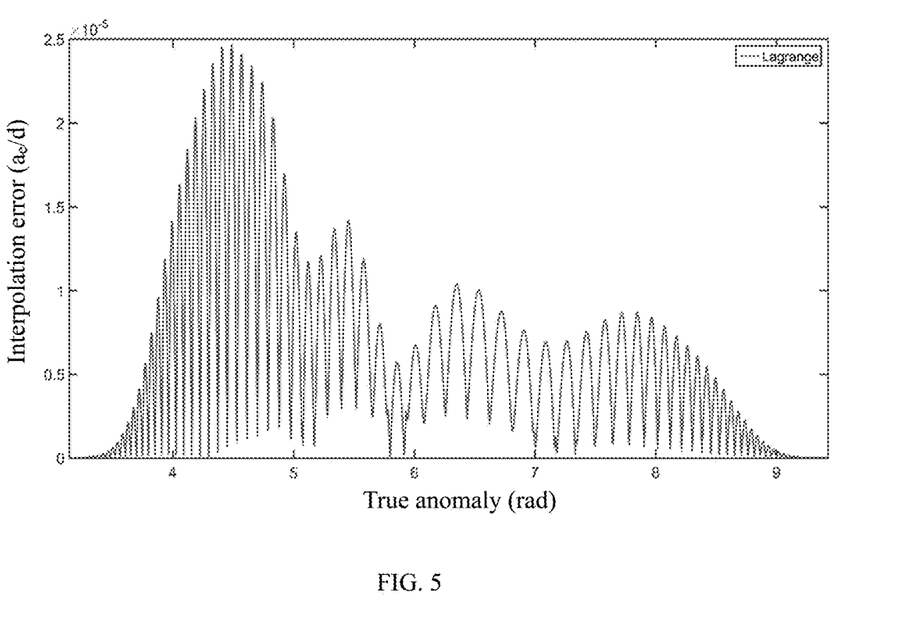
FIG. 5 shows interpolation errors of object velocities within an orbital period based on uneven nodes.

FIGS. 2 to 5 show the calculation results of the two interpolation node construction methods in one orbital period. According to the interpolation results based on evenly spaced nodes in FIGS. 2 and 3, the position and velocity errors near the perigee of the orbit have great fluctuations. The maximum position error reaches an order of $10^{-2}$, that is, the position error can reach at least tens of kilometers, and the maximum velocity error can reach an order of $10^0$, that is, the velocity error is greater than 100 m/s. FIGS. 4 and 5 show the interpolation results based on unevenly spaced nodes constructed according to the technical solution of the present disclosure. The position and velocity errors are respectively above an order of $10^{-7}$ and $10^{-5}$ at any time within one orbital period, that is, the position error does not exceed 1 m, and the velocity error does not exceed 1 mm/s. The error comparison results show that the ephemeris calculation method based on unevenly spaced interpolation nodes is superior to the navigation satellite ephemeris calculation method based on evenly spaced interpolation nodes and suitable for the calculation of high-eccentricity orbits, and can significantly improve the calculation accuracy without reducing the calculation efficiency.

Figure 6:
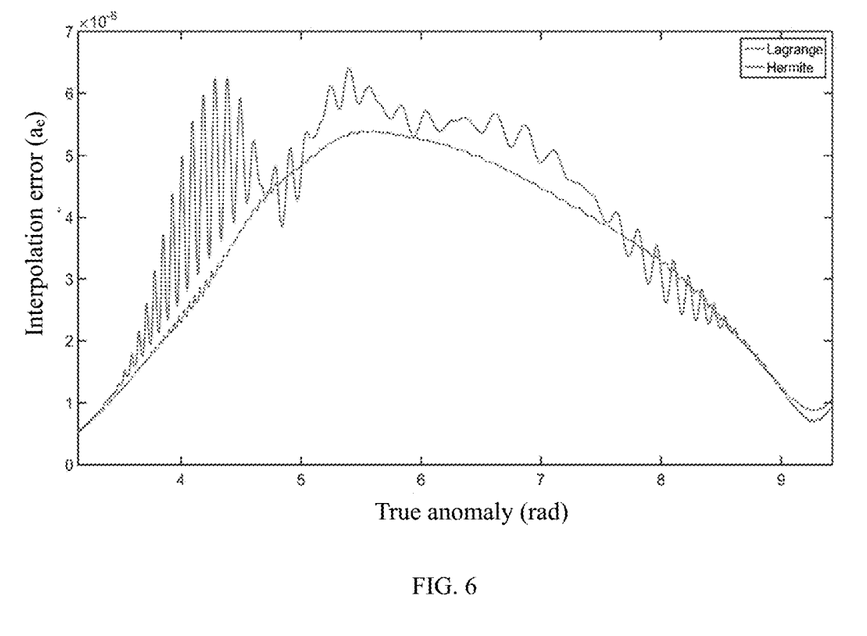
FIG. 6 shows a position-error comparison of Lagrange and Hermite methods in Case 2.
Figure 7:
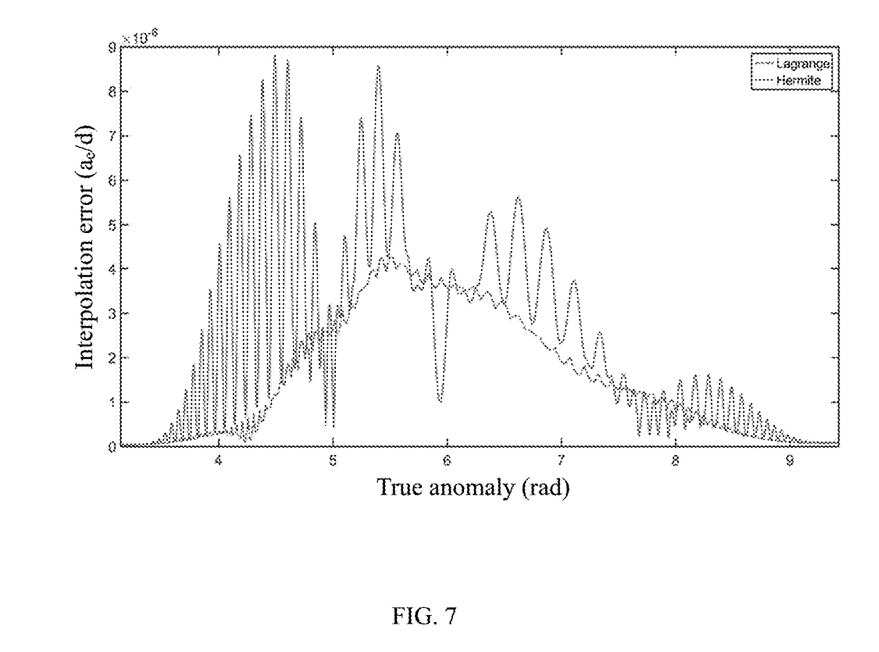
FIG. 7 shows a velocity-error comparison of Lagrange and Hermite methods in Case 2.

FIGS. 6 and 7 show changes in the position error and velocity error of the dense ephemeris obtained by using the $9^{th}$-degree Lagrange (N=114) and $7^{th}$-degree Hermite (N=60) interpolation methods within one orbital period. It can be seen from the comparison that the calculation errors of the two interpolation methods are roughly equivalent, which indirectly shows the superiority of the Hermite method, that is, the Hermite method can still guarantee the calculation accuracy with less interpolation nodes (meaning high calculation efficiency).

Table 3 demonstrates the operation results of the point-to-point integration method and the technical solution of the present disclosure on the same computer. It can be seen from the table that compared to the point-to-point integration method, although the local truncation error control accuracy of the present technical solution is higher, because the interpolation nodes are sparsely distributed on the orbit, the calculation times of the integral right function and the integration time are both greatly reduced. The time taken by this technical solution of the present disclosure is concentrated on the operation of interpolations, which is a simple algebraic operation with extremely high calculation efficiency. Therefore, the overall calculation time of the present disclosure is greatly reduced compared to the point-to-point integration method. In Case 3, the calculation efficiency of the two methods differs by about 30 to 100 times, indicating that the dense ephemeris calculation method proposed by the present disclosure can greatly improve the calculation efficiency while ensuring a certain calculation accuracy.

This embodiment illustrates the superiority of the technical solution of the present disclosure from multiple aspects. The uneven interpolation node construction method based on the time transformation theory can significantly improve the overall interpolation accuracy of the high-eccentricity orbit, and it can be used in coordination with the Hermite method to further improve the calculation efficiency. Finally, the present disclosure illustrates the efficiency of the technical solution by comparing it with the point-to-point integration method.

TABLE 3

Comparison of calculation efficiency between point-to-point integration and the technical solution of the present disclosure

| | Point-to-point integration | | Integration + interpolation | |
|---|---|---|---|---|
| e | Calculation times of integral right function | CPU calculation time (s) | Calculation times of integral right function | CPU calculation time (s) |
| 0.00 | 71187 | 1.125000 | 1283 | 0.031250 |
| 0.05 | 76843 | 1.218750 | 1219 | 0.031250 |
| 0.10 | 83317 | 1.265625 | 1233 | 0.031250 |
| 0.15 | 90675 | 1.421875 | 1287 | 0.046875 |
| 0.20 | 99384 | 1.578125 | 1391 | 0.062500 |
| 0.25 | 109447 | 1.750000 | 1495 | 0.031250 |
| 0.30 | 121379 | 1.953125 | 1599 | 0.046875 |
| 0.35 | 135590 | 2.234375 | 1599 | 0.046875 |
| 0.40 | 152891 | 2.187500 | 1597 | 0.046875 |
| 0.45 | 174135 | 2.781250 | 1697 | 0.062500 |
| 0.50 | 200875 | 2.968750 | 1675 | 0.046875 |
| 0.55 | 235234 | 3.156250 | 1777 | 0.062500 |
| 0.60 | 280605 | 4.203125 | 1766 | 0.062500 |
| 0.65 | 342797 | 5.515625 | 1831 | 0.078125 |
| 0.70 | 431886 | 6.531250 | 1844 | 0.109375 |
| 0.75 | 567658 | 8.531250 | 2063 | 0.109375 |
| 0.80 | 793182 | 11.812500 | 2208 | 0.109375 |
| 0.85 | 1220986 | 17.093750 | 2325 | 0.187500 |
| 0.90 | 2242747 | 31.671875 | 3190 | 0.343750 |

The above described are only preferred implementations of the present disclosure, and the scope of the present disclosure is not limited thereto. All technical solutions based on the idea of the present disclosure should fall within the claimed scope of the present disclosure. It should be pointed out that for a person of ordinary skill in the art, several improvements and modifications made without departing from the principle of the present disclosure should be deemed as falling within the protection scope of the present disclosure.

What is claimed is:

1. A method for accurately and efficiently calculating a dense ephemeris of a high-eccentricity orbit, wherein the method implements ephemeris calculations of a space object by solving a dynamic equation with initial values and uses a construction algorithm for uneven interpolation nodes, and the method comprises the following steps:
    step 1: calculating the initial values, comprising a semi-major axis $a_0$, an orbital period $P_r^0$ and an eccentricity $e_0$ of an osculating orbit of the space object at a time $t_0$;
    step 2: introducing a time transformation parameter δ to construct an orbital period transformation factor β;
    step 3: determining a number N of the uneven interpolation nodes in one orbital period by an interpolation method;

step 4: constructing a set of uneven interpolation nodes $\{T_l\}$ from an initial node, and generating ephemeris values on the set of interpolation nodes by numerical integration; and step 5: performing interpolations on dense ephemeris times $\{t_i\}$ according to the set of uneven interpolation nodes $\{T_l\}$ and the ephemeris values of the set of interpolation nodes, so as to complete all ephemeris calculations.

2. The method for accurately and efficiently calculating the dense ephemeris of the high-eccentricity orbit according to claim 1, wherein the ephemeris calculation of the space object corresponds to the solving of the dynamic equation as follows:

$$\ddot{\vec{r}} = \vec{F}(\vec{r},\dot{\vec{r}},t) = \vec{F}_0(\vec{r}) + \vec{F}_\varepsilon(\vec{r},\dot{\vec{r}},t) \quad (1)$$

wherein, $\vec{F}$ represents a force acting on the space object; $\vec{F}_0$ represents a central gravity of the earth; $\vec{F}_\varepsilon$ represents perturbations; $\vec{r}$ represents a position vector; $\dot{\vec{r}}$ represents a velocity vector; t represents a time variable; a position vector $\vec{r}(t_0) = \vec{r}_0$ and a velocity vector $\dot{\vec{r}}(t_0) = \dot{\vec{r}}_0$ of the space object at $t_0$ are known; $t_i$, $i=1, 2, 3, \ldots m$ represents a set of designated densely distributed time points; the calculation of the dense ephemeris comes down to calculating a position vector $\vec{r}(t_i) = \vec{r}_i$ and a velocity vector $\dot{\vec{r}}(t_i) = \dot{\vec{r}}_i$ of the space object at $t_i$ from the known $\vec{r}_0$ and $\dot{\vec{r}}_0$; considering that $t_0$ may be in an intermediate position of each range of $t_i$, $\{t_i\}$ is divided into $\{t_j^b\}$ and $\{t_k^c\}$; $\{t_j^b\}$ comprises $m_j$ elements increasing monotonously under a subscript j, wherein $m_j \geq 0$ and $t_0 < t_j^b$; $\{t_k^c\}$ comprises $m_k$ elements decreasing monotonically under a subscript k, wherein $m_k \geq 0$, $t_0 > t_k^c$, and $m_j + m_k = m$.

3. The method for accurately and efficiently calculating the dense ephemeris of the high-eccentricity orbit according to claim 2, wherein in step 1, the initial values comprising the semi-major axis $a_0$, the period $P_t^0$ and the eccentricity $e_0$ of the osculating orbit of the space object at $t_0$ are calculated as follows:

$$a_0 = \frac{\mu r_0}{-\dot{r}_0^2 r_0 + 2\mu} \quad (2)$$

$$P_t^0 = 2\pi a_0 \sqrt{a_0} / \sqrt{\mu} \quad (3)$$

$$e_0 \sqrt{1 - |\vec{r}_0 \times \dot{\vec{r}}_0|^2 / \mu a_0} \quad (4)$$

wherein, $\mu$ represents a geocentric constant of gravitation; $r_0$ is a modulus of $\vec{r}_0$; $\vec{r}_0$ and $\dot{\vec{r}}_0$ represent a position vector and a velocity vector of the space object at the time $t_0$, respectively.

4. The method for accurately and efficiently calculating the dense ephemeris of the high-eccentricity orbit according to claim 2, wherein in step 2, the time transformation parameter $\delta$ is introduced to express the orbital period transformation factor $\beta$, and $\beta$ is calculated by performing a definite integration as follows:

$$\beta = \frac{1}{2\pi} \int_0^{2\pi} \frac{1}{(1 - e \cos E)^\delta} dE \quad (5)$$

wherein, $\beta$ is a constant related to an orbital eccentricity e and $\delta$; e is substituted by $e_0$, and $\delta$ is 0.3; E represents an orbital eccentric anomaly.

5. The method for accurately and efficiently calculating the dense ephemeris of the high-eccentricity orbit according to claim 4, wherein in step 3, by taking e and $\delta$ as discrete independent variables, a numerical experiment is carried out based on the selected interpolation method to determine a minimum value of N capable of meeting an orbital calculation accuracy requirement; a table is made, and in use, a value of N corresponding to known e and $\delta$ is determined by consulting the table.

6. The method for accurately and efficiently calculating the dense ephemeris of the high-eccentricity orbit according to claim 2, wherein in step 4, the set of uneven interpolation nodes are constructed by taking $t_0$ as the initial node; $T_0 = t_0$, wherein $T_0$ is a time corresponding to the initial node; ephemeris values $\vec{R}_0 = \vec{r}_0$ and $\dot{\vec{R}}_0 = \dot{\vec{r}}_0$ on the initial node are known; the set of uneven interpolation nodes $\{T_l\}$ are constructed according to a requirement for the interpolation based on the dense ephemeris times $\{t_i\}$; the ephemeris values on the set of uneven interpolation nodes are generated along with the construction process.

7. The method for accurately and efficiently calculating the dense ephemeris of the high-eccentricity orbit according to claim 6, wherein in step 4, the set of uneven interpolation nodes $\{T_l\}$ are specifically constructed as follows:

considering that an even number q of interpolation nodes is required by an odd-order interpolation polynomial for one interpolation, the set of uneven interpolation nodes are constructed in three cases according to different distribution characteristics of the time points $\{t_i\}$ relative to $t_0$:

1) if $\{t_j^b\}$ and $\{t_k^c\}$ are both non-empty, then $m_j > 0$, $m_k > 0$, and there are time points on both sides of $t_0$; in this case, forward interpolation node construction is performed first; in a forward interpolation node construction process, if $T_l > t_{m_j}^b$ appears for the first time, wherein $t_{m_j}^b$ is an element in $\{t_j^b\}$, then the construction continues q/2−1 steps along the forward direction, and then switches to backward interpolation node construction; in a backward interpolation node construction process, if $T_l < t_{m_k}^c$ appears for the first time, wherein $t_{m_k}^c$ is an element in $\{t_k^c\}$, then the construction continues q/2−1 steps along the backward direction, and the entire interpolation node construction process ends;

2) if $\{t_k^c\}$ is empty, then $m_k = 0$, and the time points $\{t_i\}$ are all located in the forward direction of $t_0$; in this case, forward interpolation node construction is performed first; in the forward interpolation node construction process, if $T_l > t_{m_j}^b$ appears for the first time, then the construction continues q/2−1 steps along the forward direction; then a number s, s≥0 of interpolation nodes in the backward direction of an interpolation node $t_1^b$ is checked; if s≥q/2, then the entire interpolation node construction process ends; otherwise, the construction switches to backward interpolation node construction; in the backward node construction process, the construction goes q/2−s steps along the backward direction, and the entire interpolation node construction process ends; and 3) if $\{t_j^b\}$ is empty, then $m_j = 0$, and the interpolation nodes $\{t_i\}$ are all located in the backward direction of $t_0$; in this case, backward node construction is performed first; in the backward node construction process, if $T_l < t_{m_k}^c$, appears for the first time, then the construction continues q/2−1 steps in the backward direction; then a number s, s≥0 of nodes in the forward direction of an interpolation node $t_1^c$ is checked; if s≥q/2, then the entire node construction process ends; otherwise, the construction switches to forward node construction; in the forward node construction process, the construction goes q/2−s steps in the forward direction, and the entire interpolation node construction process ends;

these three interpolation node construction cases cover all the distribution characteristics of $\{t_i\}$ relative to $t_0$, and uneven forward or backward interpolation nodes $\{T_l\}$ involved are derived by:

assuming that an interpolation node $T_l$ and corresponding ephemeris values $\vec{R}_l$ and $\dot{\vec{R}}_l$ are known, then calculating the semi-major axis and the orbital period of the osculating orbit respectively according to Eqs. (6) and (7):

$$a_l = \frac{\mu R_l}{-\dot{R}_l^2 R_l + 2\mu} \quad (6)$$

$$P_t^l = 2\pi a_l \sqrt{a_l} / \sqrt{\mu} \quad (7)$$

wherein, μ is a geocentric constant of gravitation; $R_l$ is a modulus of $\vec{R}_l$; $P_t^l$ is an orbital period measured by t and calculated from the ephemeris values of a l-th node; values of $a_0$ and $P_t^0$, when l=0, are calculated in step 1;

calculating an interval between $T_l$ and an adjacent interpolation node according to Eq. (8):

$$\Delta T_l = \beta \left(\frac{R_l}{a_l}\right)^{1+\delta} \frac{P_t^l}{N} \quad (8)$$

constructing a forward node $T_{l+1}$ as:

$$T_{l+1} = T_l + \Delta T_l \quad (9)$$

constructing a backward node $T_{l-1}$ as:

$$T_{l-1} = T_l - \Delta T_l \quad (10).$$

8. The method for accurately and efficiently calculating the dense ephemeris of the high-eccentricity orbit according to claim 7, wherein in step 4, the ephemeris values on the interpolation node are specifically generated by a numerical integration as follows:

the ephemeris values on the interpolation node are generated along with the construction process, and ephemeris values $\vec{R}_{l+1}$, $\dot{\vec{R}}_{l+1}$ or $\vec{R}_{l-1}$, $\dot{\vec{R}}_{l-1}$ on the node $T_{l+1}$ or $T_{l-1}$ are derived from $T_l$ to $T_{l+1}$ or $T_{l-1}$ by a single-step method for achieving variable-step integration.

9. The method for accurately and efficiently calculating the dense ephemeris of the high-eccentricity orbit according to claim 7, wherein in step 5, for any ephemeris time $t_i$, q/2 interpolation nodes are respectively taken from both sides of $t_i$; ephemeris values on these nodes are used to interpolate by a selected interpolation method to obtain ephemeris values $\vec{r}_i$ and $\dot{\vec{r}}_i$ at the time $t_i$; then $\{t_i\}$ is traversed to complete all ephemeris calculations.

10. The method for accurately and efficiently calculating the dense ephemeris of the high-eccentricity orbit according to claim 9, wherein in step 5, the selected interpolation method is a Hermite interpolation method.

* * * * *